United States Patent [19]

Waehner et al.

[11] E Re. 28,631

[45] Reissued Nov. 25, 1975

[54] HIGH VOLTAGE DEFLECTION CORRECTION IN CRT DISPLAYS

[75] Inventors: Glenn C. Waehner, Riverside, Conn.; Thomas J. Ray, Yonkers, N.Y.

[73] Assignee: United Technologies Corporation, East Hartford, Conn.

[22] Filed: Sept. 16, 1974

[21] Appl. No.: 506,061

Related U.S. Patent Documents

Reissue of:

[64] Patent No.: 3,713,001
Issued: Jan. 23, 1973
Appl. No.: 219,465
Filed: Jan. 20, 1972

[52] U.S. Cl. ..... 315/371; 315/379

[51] Int. Cl.[2] ..... H01J 29/70

[58] Field of Search ..... 315/370, 371, 379, 411; 178/6.8

[56] References Cited

UNITED STATES PATENTS

| | | | |
|---|---|---|---|
| 2,997,622 | 8/1961 | Claypool | 315/390 |
| 3,422,306 | 1/1969 | Gray | 315/371 |
| 3,668,463 | 6/1972 | Smith et al. | 315/370 |

*Primary Examiner*—T. H. Tubbesing
*Assistant Examiner*—J. M. Potenza
*Attorney, Agent, or Firm*—M. P. Williams

[57] ABSTRACT

The X and Y deflection voltages for a CRT display are corrected to accommodate excursions in the acceleration or anode voltage of a CRT display by multiplication with a signal which is a function of the square root of the high voltage. The invention [may be practiced following pincushion correction (correction for a planar CRT screen geometry), or directly. A second embodiment] integrates pincushion and anode voltage correction, thereby to require fewer and simpler circuits.

1 Claim, 2 Drawing Figures

HIGH VOLTAGE DEFLECTION CORRECTION IN CRT DISPLAYS

Matter enclosed in heavy brackets [ ] appears in the original patent but forms no part of this reissue specification; matter printed in italics indicates the additions made by reissue.

BACKGROUND OF THE INVENTION

Field of invention

This invention relates to cathode ray tube deflection circuitry, and more particularly to correlation of deflection voltages with anode voltage excursions.

Description of the prior art

As is known in the art, the extent to which the beam of electrons in a cathode ray tube is deflected by deflection voltages is highly dependent upon the energy, or velocity, of the beam, which in turn is a function of the accelerating voltage applied to the anode of the CRT.

A recent addition to the cathode ray tube art is the multiple phosphor, variable penetration type of tube. One such tube comprises a multi-color tube in which phosphors that emit different colors in response to bombardment by electrons are arranged in layers, a first layer (closer to the gun of the CRT) excited by lower energy electrons and a second layer (further from the gun of the CRT) being separated therefrom by an energy barrier excited by higher energy electrons. Low anode voltages excite only the first phosphor (which may typically be red), while higher anode voltages (causing increasing beam energy) also excite a second phosphor (which may typically be green). Since the human eye is more sensitive to the green than to the red, and since it is more efficient than is the red, high energy bombardment gives a definite, bright (although not pure) green color while low energy bombardment gives a definite (though not pure) red color. In addition, energies between the two can provide apparent various shades of orange and greenish yellow, so that as many as four or five clearly discernible colors may be achieved with some of the more sophisticated penetration type color tubes now available.

In order to create displays in a plurality of colors, it is necessary to activate the different colors at a sufficiently rapid rate so as to create the appearance of a steady display to the eye. Typically, generation of all the symbols of one color may be followed by all the symbols of another color, and a third, etc., repetitively in a cyclic fashion. Thus, the anode voltage must be slewed between different color-producing levels at sub-video rates (for instance, the anode voltage may have to change by several kilovolts every five or ten milliseconds). Slewing of the anode voltage requires that the deflection voltages be altered suitably so as to provide the desired deflection without regard to the desired color.

In the prior art, correlation of deflection voltage with the anode voltage has typically been achieved by utilizing different fixed resistor networks which are switched in and out at sub-video rates to accommodate the different anode voltages during generation of different color portions of the display. However, this requires that the anode voltage, at each color-selecting level, be held to very close tolerances since a very minor change in anode voltage will result in a different size picture in one color in contrast with another which causes different color segments of the same display to be of different sizes and at misregistered locations. Furthermore, the rate at which video can be generated is limited by the need to allow the anode voltage to settle down (stop ringing) after switching from one voltage to another in each case. Further, there is a dependence upon discrete anode voltages (due to the need to utilize switched-in, fixed parameters), which precludes instantaneous control over color, and renders it difficult to provide multi-color section in a two-phosphor tube.

SUMMARY OF INVENTION

The object of the present invention is to provide automatic correlation between anode voltage and deflection voltage in a CRT display.

According to the present invention, the deflection voltages applied to a CRT display are correlated to the anode voltage by being amplified with a gain which varies as a function of the square root of the anode voltage . In accordance with the invention in one form, anode correlation may be achieved alone; in accordance with the invention in another form, anode correlation may be achieved on deflection voltages which already have correction for pincushion (or geometry) distortion applied thereto. In further accord with the present invention, anode correlation is provided together with CRT geometry distortion correction in an integrated deflection correction and correlation channel which utilizes fewer and simpler components.

The present invention provides automatic correlation of CRT deflection voltage with its anode voltage. Since it is automatic, there is no need to accurately control the voltage of the anode power supply. Additionally, the voltage may be readily adjusted, not only in steps to provide different phosphor penetration (such as in multi-phosphor, variable penetration color tubes), but also permits free and easy adjustment of the anode supply so as to vary the hues of colors, or provide similar functions in other displays. The invention eliminates the need for anode voltage monitoring and for switching of compensation circuits at sub-video rates; and it is far simpler, less expensive and more reliable than anode correlation circuits known to the prior art.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
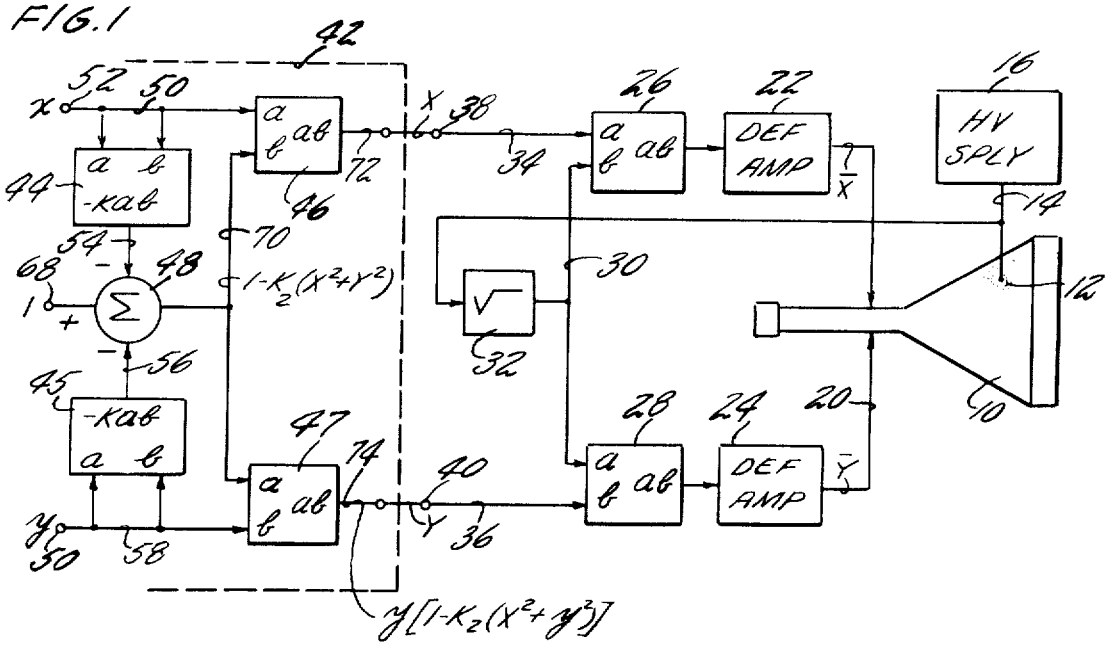
FIG. 1 is a schematic block diagram of a simple [embodiment of the present invention;] *form of anode correction known to the art

Referring now to FIG. 1 *for a general understanding of the correction used herein*, a cathode ray tube 10 has an anode terminal 12 to which high voltage is applied on a line 14 by a high voltage power supply 16. The CRT 10 has X deflection voltages applied thereto on a line 18 and Y deflection voltages applied thereto on a line 20 from respective deflection amplifiers 22, 24 which in turn are fed by related multipliers 26, 28. Each of the multipliers 26, 28 is responsive to a signal on a line 30, which is a function of the square root of the anode voltage on the line 14, in response to a square root circuit 32 which may take any one of several forms. For instance, it may comprise a diode/resistor network of the general type illustrated in a copending application of the same assignee entitled CRT Geometry Correction Network, Ser. No. 155,094, filed on June 21, 1971 by V. G. Bello, *now U.S. Pat. No. 3,825,796.* Or, it may take the form of a reciprocal exponential transconductance multiplier of the type disclosed in our copending application entitled Exponential Transconductance Multiplier and Integrated Video Processor, [(UAC Docket No. N-694)173 *Ser. No. 213,509,* filed [in] *on* Dec. *21,* 1971 , *now U.S. Pat. No. 3,793,480.* On the other hand it may comprise a squaring feedback multiplier or any one of a plethora of other known circuits which can provide the square root function. The multipliers 26, 28 are also responsive to X and Y deflection signals applied thereto on related lines 34, 36 from a pair of inputs 38, 40. Thus there are provided X and Y deflection signals $$\overline{X}=K_1X\sqrt{V} \quad (1)$$

$$\overline{Y}=K_1Y\sqrt{V} \quad (2)$$

where $\overline{X}$ is the X deflection signal as applied to the CRT $\overline{Y}$ is the Y deflection signal as applied to the CRT $K_1$ is a scalar constant X is the uncorrelated X deflection siganl at the input 38 and Y is the uncorrelated Y deflection signal at the input 40.

Thus, in the apparatus 10–40 of FIG. 1, there is disclosed a first embodiment of the present invention; that is deflection voltage amplifiers which correlate the deflection voltage with the anode voltage in a CRT display system. In this embodiment of the invention, the deflection voltages applied to the inputs 38 and 40 may either be raw deflection voltage from the video section of apparatus having information to be displayed on the CRT 10, or they may comprise deflection voltages corrected for pincushion (CRT geometry distortion) applied to the inputs 38, 40 by a pincushion correction circuit 42. The pincushion correction circuit 42, as shown in FIG. 1, is a minor variation of that disclosed in U.S. Pat. 3,422,306 to S. B. Gray; if desired, it may take that form, or a more sophisticated and accurate form as disclosed in the aforementioned copending application of Bello.

In the form shown in FIG. 1, the pincushion correction circuit 42 comprises four multiplier circuits 44–47 and a summing network 48. Because the multiplier 44 is assumed to be an inverting multiplier (or a noninverting multiplier followed by an inverter, if desired), and because both inputs of the summing network 44 are connected to a line 50 which is responsive to raw X deflection voltages applied to a raw input terminal 52 by the video source (not shown), it provides an output on the line 54 which is equal to $-KX^2$. Similarly, the multiplier 45 provides a signal on a line 56 equal to $-KY^2$ in response to raw Y deflection voltages applied over a line 58 from a raw Y input terminal 60. In addition to the signals on the lines 54, 56, the summing network 48 has an input applied thereto from a terminal [62] *68* which is a constant voltage suitably adjusted to be equivalent to unity in the given implementation of the present invention. This is achieved by suitable choice of the scale factors, or gains, in the circuit, relative to the voltage input at the terminal [62] *68* so that deflection giving the sum $(x^2+y^2)$ equal to [unity] *zero* will result in [no] *unity* output from the summing network 48, as is well known in the art.

The output of the summing network 48 on a line 70 comprises a signal equivalent to $$1-K_2(x^2+y^2) \quad (3)$$

This signal is applied by a line 70 to the multipliers 46, 47 together with the raw X and raw Y deflection voltages, respectively, so as to provide CRT distortion corrected X and Y deflection voltages on related signal lines 72, 74 as follows:

$$X=x[1-K_2(x^2+y^2)] \quad (4)$$

$$Y=y[1-K_2(x^2+y^2)] \quad (5)$$

Equations 4 and 5 will be recognized by those skilled in the art as expressions for deflection voltages which have been approximately corrected for CRT distortion. By making $K_2$ a nonlinear variable, the more accurate correction of the Bello [application] *patent* may be achieved, as described therein. By substituting Equations 4 and 5 into Equations 1 and 2 it can be seen that the actual deflection voltages achieved in the full circuitry of FIG. 1 are $$\overline{X}=K_1\sqrt{V}x[1-K_2(x^2+y^2)]=K_1\sqrt{V}x-K_1K_2\sqrt{V}x(x^2+y^2) \quad (6)$$

$$\overline{Y}=K_1\sqrt{V}y[1-K_2(x^2+[y_2]y^2)]=[K'] K_1\sqrt{V}y-K_1K_2\sqrt{V}y(x^2 2+y^2) \quad (7)$$

Figure 2:
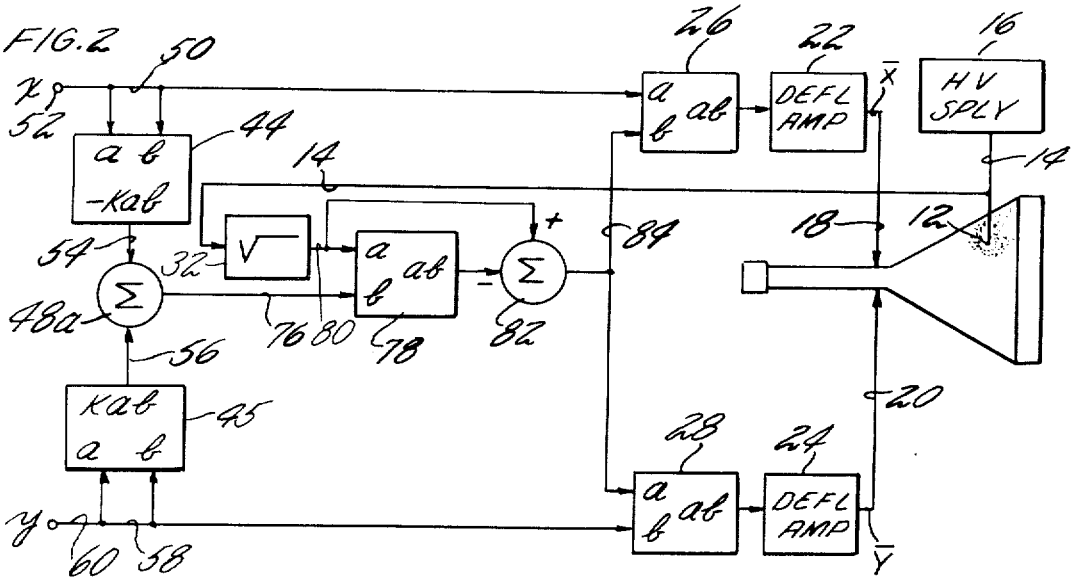
* and FIG. 2 is a schematic block diagram of an embodiment of the present invention integrated with CRT geometry distortion correction.

It should be understood that the geometry distortion correction circuitry 42 forms no part of the present invention, but is described herein as an aid in understanding a second embodiment of the invention in which anode correlation and geometry distortion correction are integrated, as is illustrated in FIG. 2.

Referring now to FIG. 2, like elements performing the same function as in FIG. 1 bear the same reference numerals and will not be described further. In FIG. 2, the summing network 48a does not have a constant input thereto, so that its output on a line 76 comprises simply $$-K_2(x^2+y^2) \quad (8)$$

This is applied to a multiplier 78 (which in a sense combines the functions of the multipliers 46, 47) to which the output of the square root circuit 32 is also applied so as to generate a signal on a line 80 which is equivalent to $$-\sqrt{V}K_2(x^2+y^2) \quad (9)$$

The signal on the line 80 is applied to a summing network 82 which is also responsive to the anode voltage on the line 14 to provide a signal on a line 84 which is $$\sqrt{V}-\sqrt{V}K_2(x^2+-2) \quad (10)$$

Then, the multipliers 26, 28 respond to the signal on the line 84 and to the respective signals on lines 50 and 58 so as to provide $$\overline{X}=K_1x\sqrt{V}-K_1x\sqrt{V}K_2([x_2]x^2+y^2) \quad (11)$$

$$\overline{Y}=K_1y\sqrt{V}-K_1y\sqrt{V}K_2(x^2+[y_2]y^2) \quad (12)$$

It can be seen that Equations 11 and 12 are the same as Equations 6 and 7. Thus, the circuit of FIG. 2 provides, in an integrated fashion, the combined distortion correction and anode voltage correlation as provided independently by the distortion correction circuit 42 and the remaining circuitry of FIG. 1.

The multipliers 44, 45 must be four-quadrant multipliers since both inputs may be either positive or negative. On the other hand, the multipliers 26, 28 and 46, 47 need only be two-quadrant multipliers since the inputs thereto on lines 30 and 70, respectively, are always positive and only the other inputs could be either positive or negative. The multipliers 78 in FIG. 2 need only be a single quadrant multiplier since both inputs are always positive. As is known, fewer quadrants usually can be achieved in less expensive circuitry; thus, there is an additional advantage to the circuit of FIG. 2, in that it not only eliminates one multiplier compared to the total circuitry of FIG. 1, but allows use of a simpler one as well.

As mentioned hereinbefore, the [present invention] *anode correction* may be practiced without pincushion correction by using simply the apparatus 10–40 in FIG. 1, and not utilizing the pincushion (or geometry distortion) correction circuit 42 in FIG. 1, nor related apparatus in FIG. 2. This may be advantageous where space, cost or weight are critical factors since the dependence of deflection on high voltage is a forty to fifty percent effect, whereas the deflection correction is more like a ten percent effect. This also means that the multipliers used only for pincushion correction need not be high quality, though it is preferable that the multipliers used in anode correlation be of relatively high quality.

Although the invention has been shown and described with respect to preferred embodiments thereof, it should be understood by those skilled in the art that the foregoing and various other changes and ommissions in the form and detail thereof may be made therein without departing from the spirit and the scope of the invention.

Having thus described typical embodiments of our invention, that which we claim as new and desire to secure by Letters Patent of the United States is:

[1. A cathode ray tube display system comprising:

a cathode ray tube having a high voltage anode;

a high voltage supply connected to said anode and providing an anode voltage thereto;

means responsive to said high voltage supply for generating a signal as a function of the square root of said anode voltage; and means receiving X and Y deflection voltages in accordance with that which is to be displayed on said cathode ray tube and responsive to said square root means to provide deflection voltages to said cathode ray tube which are functions of the respective products of said X and Y deflection voltages with said square root signal.]

2. In a cathode ray tube display system receiving raw x and y deflection voltages to govern desired displays on the cathode ray tube, the deflection voltage modificationn apparatus comprising:

a cathode ray tube having a high voltage anode;

a high voltage supply providing an anode voltage to the anode of said cathode ray tube;

means responsive to said high voltage supply for providing a signal as a function of the square root of said anode voltage;

sun [*sum*]means receiving raw x and y deflection voltage signals and providing a negative scalar of the sum of the squares thereof;

means responsive to said sum means [,] *and* said square root means [and said high voltage supply] for providing a signal which is a function of said [anode voltage] *square root signal* minus the product of said square root signal and said negative scalar function of said sums of squares signals; and means receiving said raw x and y deflection voltages and responsive to said last named means for providing X and Y deflection signals to said cathode ray tube as respective products of the output of said last named means and said raw deflection voltages.

* * * * *

UNITED STATES PATENT OFFICE

CERTIFICATE OF CORRECTION

PATENT NO. : Re. 28,631

DATED : November 25, 1975

INVENTOR(S) : Glenn C. Waehner and Thomas J. Ray

It is certified that error appears in the above-identified patent and that said Letters Patent are hereby corrected as shown below:

Column 2, line 23, before ". In" insert --[-- (heavy bracket)

Column 2, line 29, after "provided" insert --]-- (heavy bracket)

Column 2, line 55, ";]" should read --];--

Column 3, line 16, delete "173"

Column 3, line 33, "siganl" should read --signal--

Column 3, line 43, "voltage" should read --voltages--

Column 4, line 6, "flection" should read --flections--

Column 4, Equation 7, line 34, "$(x^2 2+y^2)$" should read --$x^2+y^2$--

Column 4, Equation 10, line 59, "$(x^2+-2)$" should read --$x^2+y^2$--

Column 6, claim 2, line 20, "cationn" should read --cation--

Column 6, claim 2, line 27, "sun [sum]" should read -- [sun] sum--

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*